Dec. 30, 1930. J. S. REID 1,786,721
ATTACHMENT FOR TUBULAR MEMBERS
Filed Sept. 25, 1926

Inventor
James S. Reid
By Brockett & Hyde
Attorneys

Patented Dec. 30, 1930

1,786,721

UNITED STATES PATENT OFFICE

JAMES S. REID, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO

ATTACHMENT FOR TUBULAR MEMBERS

Application filed September 25, 1926. Serial No. 137,685.

This invention relates to attachments for cap closed tubular members, such as the filler members of automobile fuel tanks and the like. More particularly, the present invention relates to attachments for tubular members of the type adapted to be closed by cap members having opposed locking finger portions, said tubular members being provided with opposed cam portions for co-operation therewith.

Automobile fuel tanks, for example, are usually so located that the tubular filler members thereof can be made in one standard size and of straight form, thereby materially simplifying and reducing the cost of construction of these members. However, tubular filler structures of greater length than the standard size member, or of bent form, are sometimes required, and it is the object of this invention to provide an attachment for a standard size member in the form of an auxiliary filler member, which is adapted for simple removable attachment to the standard size filler member and to have removably secured thereto a standard size cap member, thereby enabling a tubular filler structure of the desired length or of the desired bent form to be easily and simply provided.

More particularly, it is the object of this invention to provide an auxiliary filler member which is provided at one end with opposed cam portions for detachable engagement with the locking fingers of a standard size cap member and at its other end with locking fingers for detachable engagement with the opposed cam portions of a standard size filler member. Therefore, a standard size cap member may be either directly applied to a standard size filler member or to an auxiliary filler member which in turn is applied to a standard size filler member.

Further objects of the invention are in part obvious and in part will appear more in detail hereinafter.

Figure 1:
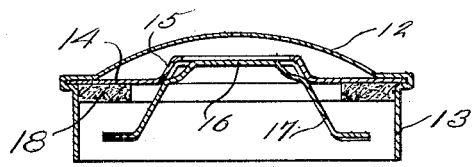
Figures 2, 4:
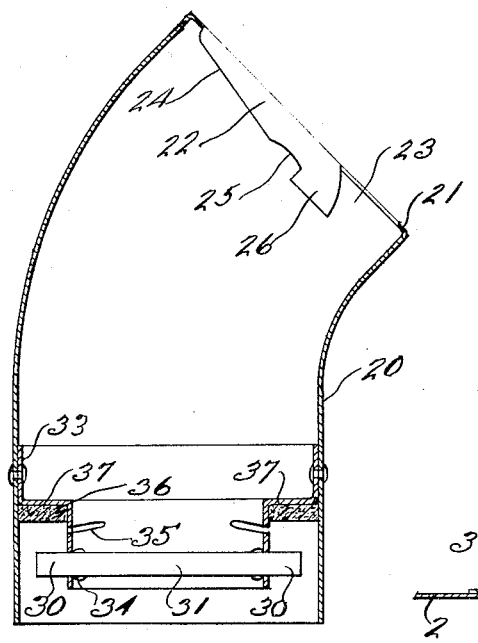
Figure 3:
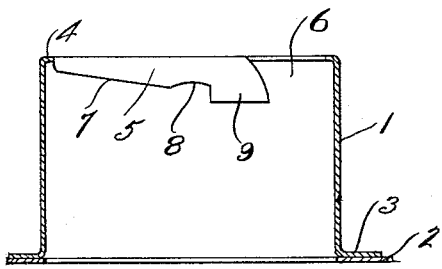
Figure 5:
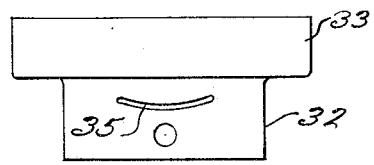
Figure 6:
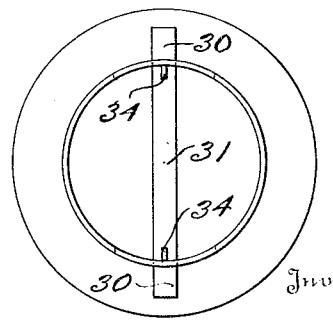

Referring to the drawings, Fig. 1 is a vertical sectional view of a standard size cap member; Fig. 2 is a vertical sectional view of my attachment or auxiliary filler member; Fig. 3 is a vertical sectional view of a standard size filler member; Fig. 4 is a vertical sectional view of these three members assembled together; Fig. 5 is a side elevation of the locking means of the auxiliary filler member; and Fig. 6 is a bottom plan view thereof.

For purposes of illustration, there are illustrated in the drawings a tubular filler member and a cap member therefor of the construction disclosed in my prior patent for closures, No. 1,593,847, granted July 27, 1926, to which reference may be had, if desired.

Said tubular filler member comprises a cylindrical body wall 1 which may be an integral part of an automobile fuel or other tank 2 or separate therefrom, and provided with a lateral base flange 3 for attachment to said tank. At its upper end, said body wall is provided with an inwardly extending, substantially horizontal flange 4 terminating in a depending flange 5. At two diametrically opposite points, portions of flanges 4 and 5 are cut away so as to provide two passageways 6, through which the locking fingers of the cap member are adapted to pass, as will later appear. The cutting away of said flanges provides two depending flanges 5 of substantially semi-circluar form, and the bottom edges of these flanges are inclined to provide cam portions 7 with which the locking fingers of the cap member are adapted to co-operate in effecting detachable locking engagement of the cap and tubular members. At the rear ends of these cam portions are provided recessed dwell portions 8 and just beyond said dwell portions, the depending flanges 5 are provided with depending projections 9 which provide stop portions for the locking fingers of the cap member, thereby limiting rotary movement of the cap member relative to the tubular filler member.

The cap member co-operating with said tubular member is here shown as comprising a dome-shaped top portion 12 and a depending marginal skirt portion 13, within which is crimped, at the junction thereof, a substantially flat annular supporting member 14. Said member is provided at its inner edge with an upwardly extending flange 15 to which is crimped the substantially circular flat body portion 16 of a locking member having two diametrically opposed locking spring fingers 17 extending downwardly and outwardly from said body portion. The cap member is also provided with a yielding gasket 18 which is adapted to engage the supporting member 14 of the cap member and the inwardly extending horizontal flange 4 of the tubular member when said members are assembled together.

The cap member is adapted to be applied to the tubular filler member in the usual manner of bayonet joint connections, the locking fingers 17 of the cap member being passed down through the passageways 6 of the tubular member. The cap member is then turned in a clockwise direction, which causes the locking fingers thereof to ride up the cam portions 7 of the tubular member, rotary movement of the cap member being continued until the locking fingers thereof strike the stop portions 9 of the tubular member. To remove the cap member, it is only necessary to turn it in the reverse direction, as will be readily understood.

Coming now to the attachment forming the subject matter of the present application, 20 represents the tubular body portion of an auxiliary tubular filler member which is but slightly larger in diameter than the filler member heretofore described and which will be referred to as the "standard size" filler member. In the embodiment here shown, the auxiliary member is of bent form but it may be, of course, of straight form, if desired. The upper end portion of this auxiliary filler member is identical in construction with the upper end portion of the standard size filler member, and therefore is provided with an inwardly extending, substantially horizontal flange 21, two depending, substantially semicircular flanges 22 separated by passageways 23, cam portions 24 on the bottom edges of said flanges 22, recessed dwell portions 25 in the rear ends of said cam portions, and stop portions 26 just beyond said dwell portions.

The cap member heretofore described and which will be referred to as a "standard size" cap member, is therefore adapted for detachable locking engagement with the upper end of said auxiliary filler member, just as with the upper end portion of the standard size filler member. It is to be noted that the skirt portion 13 of the cap member is slightly larger in diameter than the cylindrical body wall 20 of the auxiliary filler member, which in turn is slightly larger in diameter than the cylindrical body wall 1 of the standard size filler member. However, the standard size member and the auxiliary member might be made the same size in cross dimension.

The lower end portion of the auxiliary filler member is provided with suitable locking fingers for co-operation with the cam portions 7 of the standard size filler member so as to enable said members to be detachably connected. In the embodiment here shown, the locking fingers of the auxiliary filler member comprise the projecting end portions 30 of a pin or rod 31 which is arranged within suitable openings in the reduced, cylindrical, depending portion 32 of a hollow sheet metal supporting member. The upper enlarged cylindrical portion 33 of said member is riveted or otherwise suitably secured to the inner surface of the cylindrical body wall 20 of the auxiliary filler member and preferably at some distance from the bottom edge of said wall, so that a portion of said wall is provided below the enlarged portion 33 of said supporting member for telescopic relation with the upper end portion of the standard size filler member. Said pin or rod 31 is preferably held in proper position in the openings of portion 32 of the supporting member by lugs or projections 34 which are formed by pinching said rod, and in order to enable the projecting ends 30 of said rod to yieldingly engage the cam portions 7 of the standard size filler member, said supporting portion 32 is provided above said projecting rod portions with transverse slots 35. The rod itself need not, therefore, be made of resilient material and at the same time the gasket 36, which is adapted to lie between the inwardly extending flange 4 of the standard size filler member and the horizontal shoulder 37 of the rod supporting member, is not subjected to undue compression.

The auxiliary filler member is applied to the standard size filler member by simply passing the finger portion 30 of the former through the passageways 6 of the latter, and thereafter imparting clockwise rotary movement to said auxiliary member so as to cause the locking fingers thereof to ride up the cam portions 7 of said standard size member. The cap member can be readily applied to the upper end portion of said auxiliary member, or if said auxiliary member is not needed, the cap member can be applied directly to the standard size filler member, as will be readily understood.

In the present embodiment, the flanges at the upper ends of the auxiliary and standard size filler members are shown as integral parts of said members but it is to be understood that they may be formed as separate parts and be suitably secured thereto. However, for manufacturing purposes the integral arrangement is preferable and the auxiliary members with said integral flanges at one end may be formed in any desired length. If a shorter member is desired, a portion of the lower end of one member may be cut off and the support 32, 33 for the locking pin 31 may thereafter be secured in the proper position.

The bayonet joint type of connection between the auxiliary and standard size member requiring only limited rotary movement to effect a connection therebetween, enables an auxiliary member of bent form to be connected to a standard size member in places where there is little room or space and where it would be impossible to fully rotate the bent auxiliary member.

What I claim is:

1. An extension attachment for tubular necks of the type having opposed locking portions adjacent one end thereof, comprising a tubular extension body member, a hollow supporting member secured to said body member and provided with a pair of opposed openings, and rod means mounted in said openings and having outwardly projecting locking end portions for bayonet-joint locking engagement with the locking portions of said neck, whereby said extension attachment can be detachably connected to said neck.

2. An extension attachment for tubular necks of the type having opposed, substantially rigid locking portions adjacent one end thereof, comprising a tubular extension body member, a hollow supporting member secured to said body member and provided with a pair of opposed openings, substantially rigid rod means mounted in said openings and having outwardly projecting end portions for bayonet-joint locking engagement with the locking portions of said neck so as to enable said extension attachment to be detachably connected to said neck, said supporting member being provided with a slot to enable the end portions of said rod means to engage the neck locking portions with yielding effect.

3. An extension attachment for tubular necks of the type having opposed, substantially rigid locking portions adjacent one end thereof, comprising a tubular extension body member, a hollow supporting member secured to said body member and provided with a pair of opposed openings, substantially rigid rod means mounted in said openings and having outwardly projecting end portions for bayonet-joint locking engagement with the locking portions of said neck so as to enable said extension attachment to be detachably connected to said neck, said supporting member being provided above each of the openings thereof with a transverse slot to enable the end portions of said rod means to engage the neck locking portions with yielding effect.

4. An extension attachment for tubular necks of the type having a transverse gasket-engaging shoulder and opposed locking portions, comprising a tubular extension body member, a supporting member having an upper tubular portion adapted to be secured to said body member and a lower tubular portion of reduced size, thereby providing between said tubular portions an annular transverse gasket-engaging shoulder for cooperation with said gasket-engaging neck shoulder, said lower tubular portion being provided with a pair of opposed openings, and rod means mounted in said openings and having outwardly projecting end portions for engagement with the locking portions of said neck so as to enable said extension attachment to be detachably connected to said neck.

5. An extension attachment for tubular necks of the type having a transverse gasket-engaging shoulder and opposed locking portions, comprising a tubular extension body member, a supporting member having an upper tubular portion adapted to be secured to said body member and a lower tubular portion of reduced size, thereby providing between said tubular portions an annular transverse gasket-engaging shoulder for cooperation with said gasket-engaging neck shoulder, said lower tubular portion being provided with a pair of opposed openings, and rod means mounted in said openings and having outwardly projecting end portions for engagement with the locking portions of said neck so as to enable said extension attachment to be detachably connected to said neck, said lower tubular portion being also provided with a transverse slot to enable the end portions of said rod means to engage the locking portions of the neck with yielding effect.

In testimony whereof I hereby affix my signature.

JAMES S. REID.